UNITED STATES PATENT OFFICE.

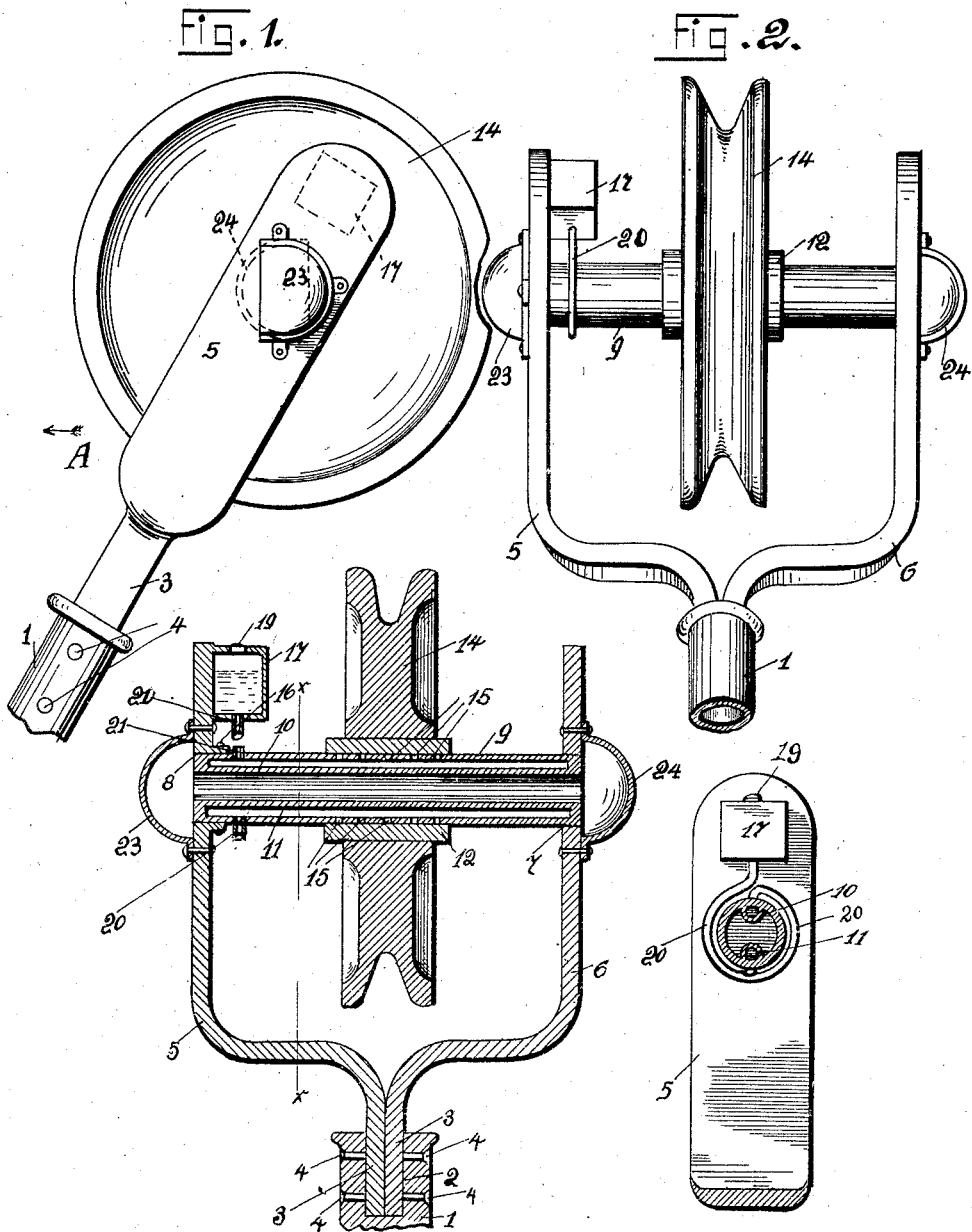

CHARLES M. RHODES, OF STEUBENVILLE, OHIO.

TROLLEY.

No. 874,242.　　　Specification of Letters Patent.　　　Patented Dec. 17, 1907.

Application filed November 10, 1904, Serial No. 232,187. Renewed September 20, 1906. Serial No. 335,481.

*To all whom it may concern:*

Be it known that I, CHARLES M. RHODES, a citizen of the United States of America, residing at Steubenville, in the county of Jefferson and State of Ohio, have invented certain new and useful Improvements in Trolleys, of which the following is a specification, reference being had therein to the accompanying drawing.

This invention relates to certain new and useful improvements in trolleys, and has for its object the provision of novel means for aerating and lubricating the trolley wheel.

It is a well known fact that the friction of trolley wheels revolving too rapidly overheats the spindle and the hub portions of said wheels to such an extent as to fuse the metals and render the same useless, and the object of my invention is to provide novel means in connection with the harp which supports the trolley wheel, for lubricating the spindle thereof and for creating a draft of air through the spindle which will maintain the same in a cool state during its operation.

Briefly described, the principal features of my improved trolley reside in a hollow spindle upon which a trolley wheel is adapted to rotate, and upon the harp of a trolley I provide a lubricating receptacle, together with novel means for conveying the lubricant to the trolley wheel; and this construction together with the details entering into the same will be hereinafter more fully described.

Referring to the drawing accompanying this application, Figure 1 is a side elevation of my improved trolley, Fig. 2 is an end view of the same, Fig. 3 is a transverse vertical sectional view of my improved trolley, and Fig. 4 is a vertical sectional view taken on the line x—x of Fig. 3.

To put my invention into practice, I employ a trolley pole as designated by the reference numeral 1, which in its upper end is provided with a rectangular recess 2 in which the ends 3 of my improved harp are secured by pins 4, 4 or other suitable fastening means. The harp consists of the two arms 5 and 6, one arm being provided with a screw threaded aperture 7; while the other arm is provided with a flanged aperture 8. These apertures are adapted to aline with one another and in said apertures is secured a hollow spindle 9. The spindle longitudinally of its length is provided with the diametrically opposite hollow ribs 10 and 11. Centrally of the hollow spindle is rotatably mounted a sleeve 12, upon which is mounted the ordinary type of trolley wheel 14. The hollow spindle adjacent to the sleeve 12 is provided with a plurality of apertures 15 which communicate with the hollow ribs 10 and 11. The hollow spindle is secured in the apertures 7 and 8 of the harp by the screws 16, which pass through the flanges of the opening 8 and prevent the hollow spindle from rotating and becoming disengaged from the screw threaded aperture 7; the spindle having been provided with a screw threaded end whereby it may be secured in said aperture.

The arm 5 of my improved harp is provided with an integral lubricating receptacle 17, this receptacle being arranged relative to the hollow spindle as illustrated in Fig. 4 of the drawings, the receptacle being disposed above the spindle 9. The receptacle is provided with an opening 19 provided with a suitable closure whereby a lubricating material may be placed in the receptacle. The receptacle 17 is connected by a small pipe 20 to the hollow rib 11 which forms a path for the lubricant to the apertures 15 in the spindle 9, where it is fed to the trolley wheel. The pipe 20 is continued around the spindle 9 as at 21 and communicates with the other hollow rib 10.

Each of the arms 5 and 6 of my improved harp is provided adjacent to the open ends of the spindle 9 with hoods 23 and 24, these hoods being arranged opposite to one another as clearly illustrated in Figs. 1 and 2 of the drawings. The opening of the hood 23 is reverse to the opening of the hood 24, whereby when the trolley is in operation air will pass in the hood 23, through the hollow spindle 9, and be emitted from the hood 24, this passage of air creating a draft which will at all times maintain the hollow spindle in a cool state. By referring to Fig. 1 of the drawing it will be seen that the hood 23 is in position to receive air when the trolley is traveling in the direction indicated by the arrow "A" of this figure and that the hood 24, which is illustrated in dotted lines, will form a shield for the open end of the spindle, whereby the air which is passing through said spindle may be gradually emitted therefrom; these hoods in connection with the hollow spindle providing a thorough and positive aerator for the journal of the trolley wheel.

Having fully described my invention, what I claim and desire to secure by Letters Patent, is:—

1. A device of the type described comprising a two piece harp, a spindle mounted in said harp, said spindle having an opening extending from end to end thereof, a wheel rotatably mounted upon said spindle, means carried by said harp for lubricating said wheel, and means carried by said harp for deflecting air into and through the opening in said spindle, substantially as described.

2. The combination with a trolley pole, of a two-piece harp secured to said pole, a spindle carried by said harp, a wheel journaled upon said spindle, means for ventilating said spindle, and means for lubricating the wheel, mounted upon said spindle through a longitudinal passage formed in the spindle.

3. The combination with a trolley pole, of a two-piece harp secured to said pole, a hollow spindle mounted in said harp, a wheel journaled upon said spindle, receptacles carried by said harp and adapted to contain a lubricant, means for conveying said lubricant through said spindle and to the outside thereof at a point within the hub of the wheel, and means for ventilating said spindle, substantially as described.

4. The combination with a trolley pole, of a harp secured to said pole, a hollow spindle mounted in said harp, a wheel journaled upon said spindle, a receptacle carried by said harp and adapted to contain a lubricant, means for conveying said lubricant from said receptacles through the spindle to a point within the hub of the wheel journaled upon said spindle, and means for deflecting air into said hollow spindle, substantially as described.

5. In a device of the type described, the combination with a harp, of a spindle mounted in the arms thereof, said spindle having an opening extending through from end to end thereof, and an air deflector arranged at each end of the spindle, the air deflector at one end opening in a direction opposite to the deflector at the other end of the spindle, substantially as described.

In testimony whereof I affix my signature in the presence of two witnesses.

CHARLES M. RHODES.

Witnesses:
HUGH P. McGOWAN,
MORTIMER S. GILLETT.